Nov. 30, 1948. W. H. HUNTER 2,454,874
COVERING FOR PREVENTING ICE FORMATION ON AIRCRAFT
Filed April 23, 1943 3 Sheets-Sheet 1
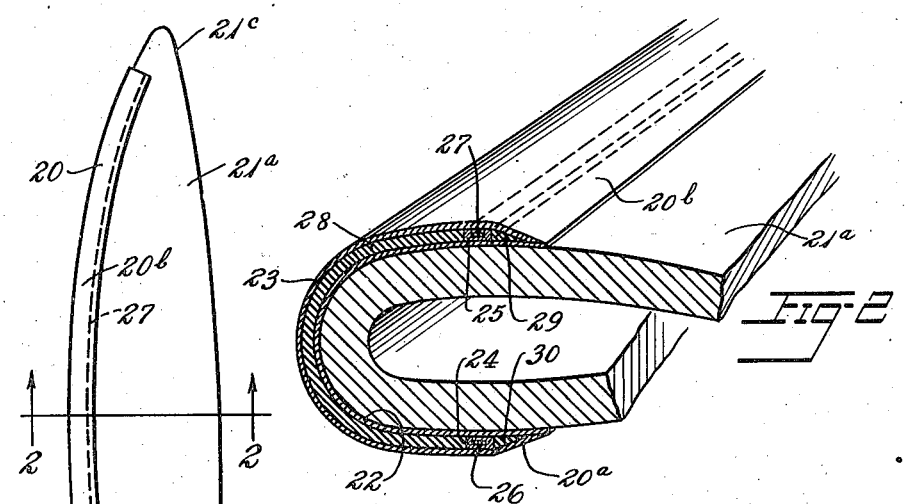
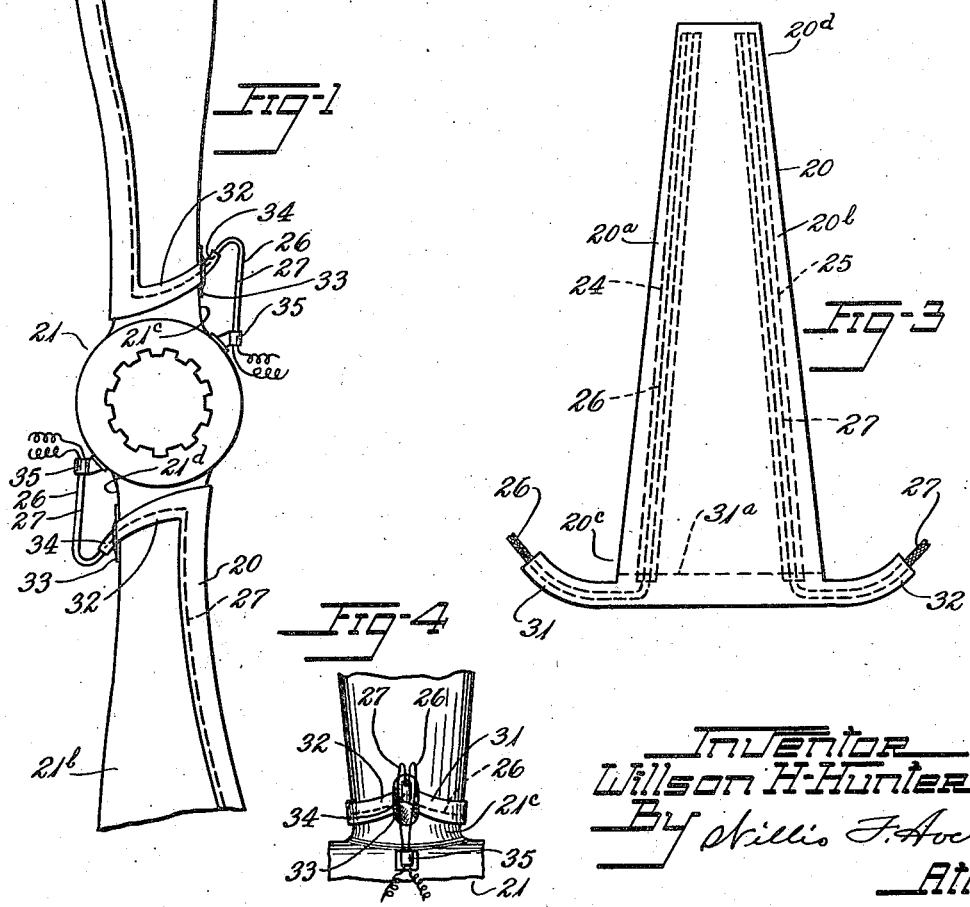

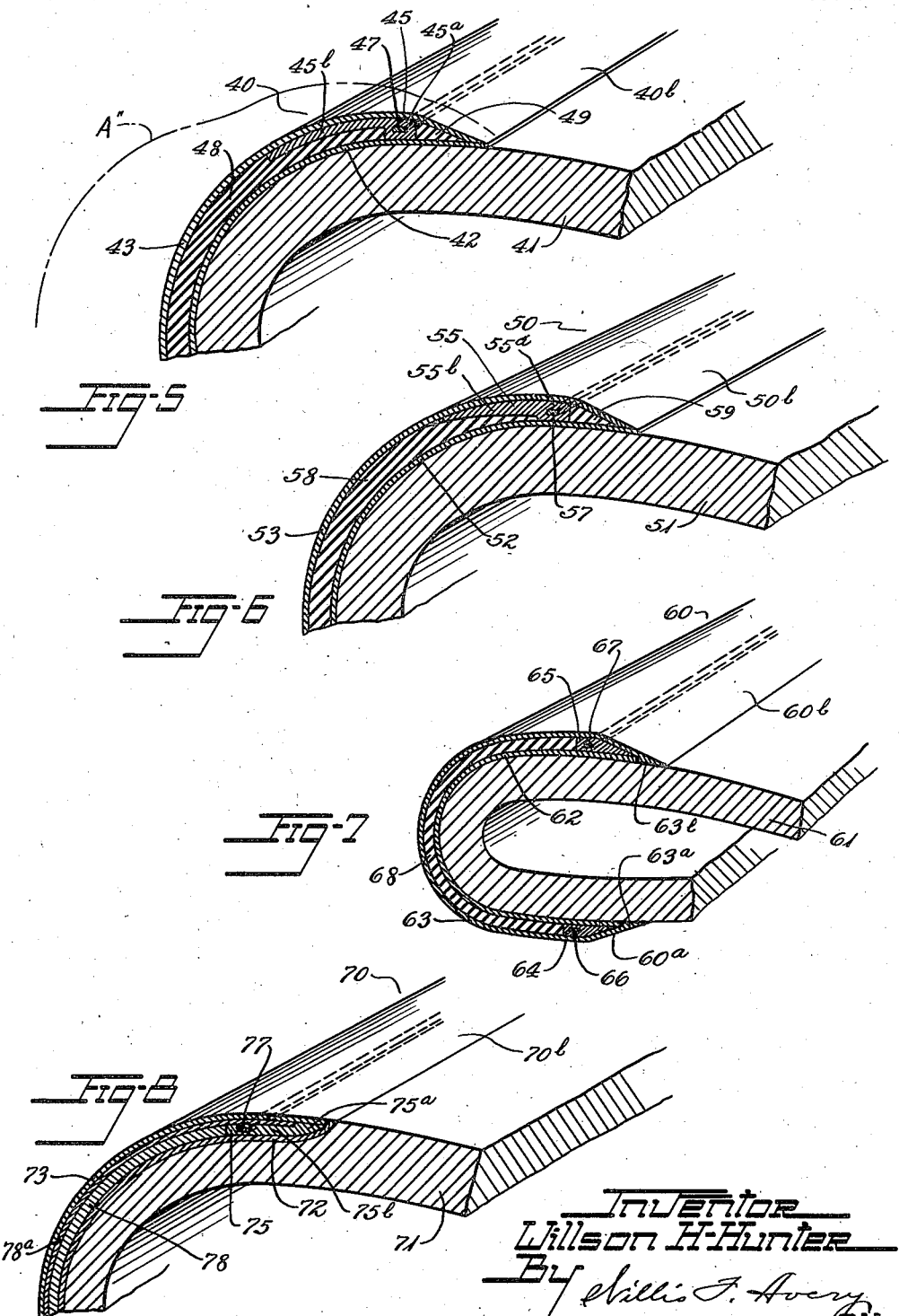

Nov. 30, 1948.  W. H. HUNTER  2,454,874
COVERING FOR PREVENTING ICE FORMATION ON AIRCRAFT
Filed April 23, 1943  3 Sheets-Sheet 3
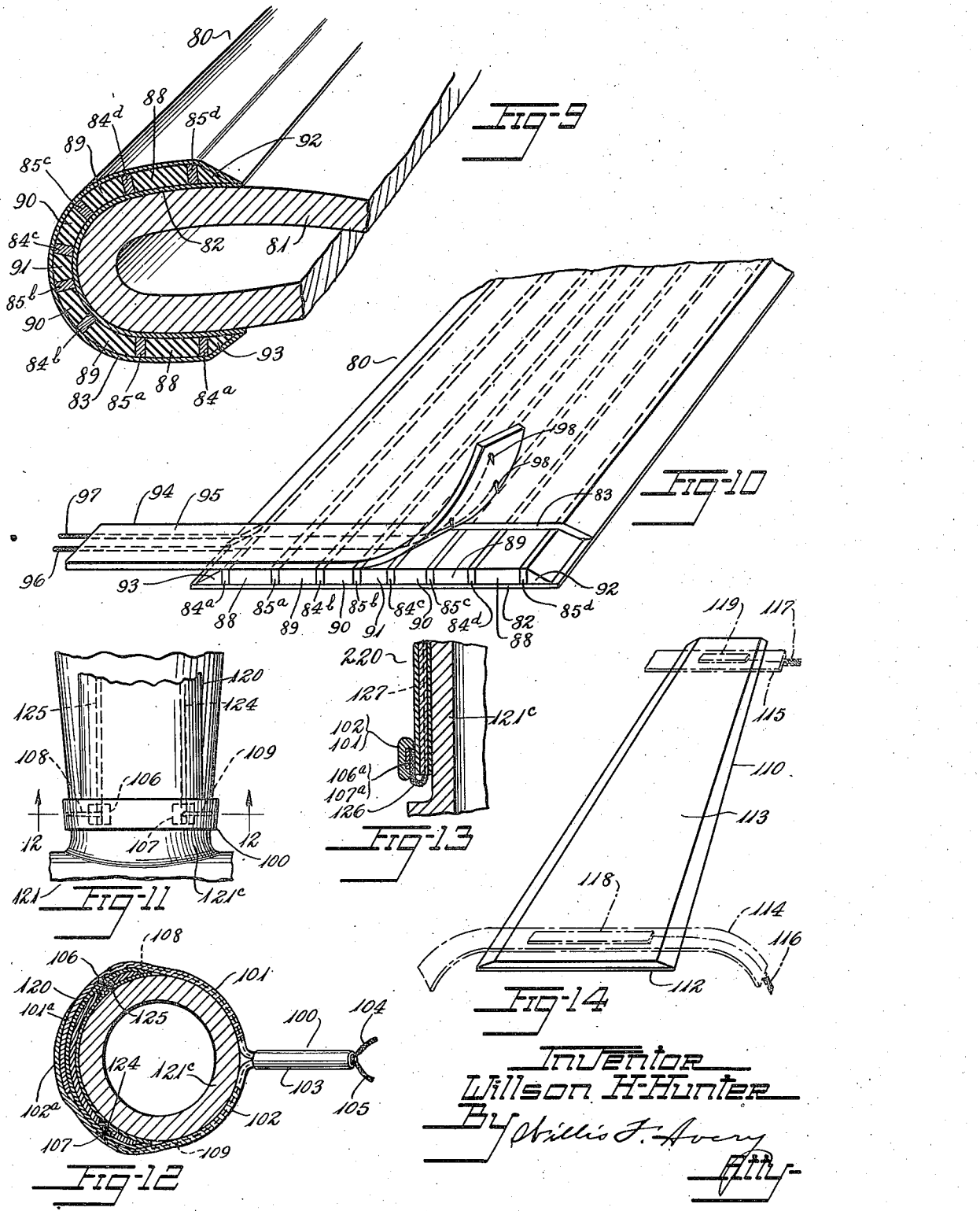

Patented Nov. 30, 1948

2,454,874

UNITED STATES PATENT OFFICE 2,454,874

COVERING FOR PREVENTING ICE FORMATION ON AIRCRAFT

Willson H. Hunter, Akron, Ohio, assignor to The B. F. Goodrich Company, New York, N. Y., a corporation of New York Application April 23, 1943, Serial No. 484,183

9 Claims. (Cl. 244—134)

1

This invention relates to the protection of aircraft from the accumulation of ice thereon and especially to the protection of propeller blades.

Aircraft, during flight, may encounter atmospheric conditions which cause the formation of ice, such, for example, as rime or glaze, on airfoils and other surfaces of the aircraft structure and especially on the leading edges thereof. It is desired that such ice formations be prevented or removed to avoid detrimental effects upon the flight performance of the aircraft.

The problem is especially serious in propellers where it has been found that serious vibration results from ice formation on the blades, which vibration may result in improper operation or damage to the structure, or both, not only of the propeller but also of other parts of the aircraft as well. Because of the additional speed of the propeller blades due to their rotation as compared to the speed of non-rotating surfaces, such, for example, as the wings, during flight, there is a greater distance traversed through air under icing conditions by the propeller blades than by the wings, and the blades thus tend to collect ice at a much master rate than do the non-rotating surfaces. This problem is somewhat aggravated by the greater convection cooling caused by the ambient air stream.

The chief objects of the invention are to provide for effectively preventing the accumulation of ice on aircraft and especially on propeller blades; to provide for such prevention without materially affecting the aerodynamic properties of the surface, and without requiring resort to anti-icing liquids for the protection; and to provide for obtaining such protection electrothermally.

Other objects are to provide a protective covering utilizing resilient rubber or other rubber-like material with provision for heating the surface of the covering in a manner effective for the protection against ice; to provide for obtaining temperature variations in different regions of the covering in accordance with the requirements for the protection desired; to provide constructional features lending themselves to flexibility and latitude of choice by the builder to suit the requirements of particular installations; to provide for the desired heating function while keeping the thickness and weight of the covering to a minimum; and to provide for convenience of manufacture and installation, and serviceability of the product.

These and other objects and advantages of the

2 invention will be apparent from the following description:

In the accompanying drawings, which form a part of this specification and in which like numerals are employed to designate like parts throughout the same.

Fig. 1 is a front elevation showing a protective covering mounted on the blades of a propeller and constructed in accordance with and embodying the invention, parts being broken away, Fig. 2 is a perspective and sectional view taken along line 2—2 of Fig. 1, parts being broken away, Fig. 3 is a plan view as seen from above of the protective covering before being mounted, Fig. 4 is a view looking at the rear of a root portion of the propeller, showing an electrical connection arrangement for the protective covering, parts being broken away, Fig. 5 is a perspective view of a modified construction of the protective covering mounted on a hollow blade, parts being broken away and in section, and showing also a temperature distribution curve chordwise of the covering.

Figs. 6, 7, 8 and 9 are perspective views of further modified constructions, parts being broken away and in section, Fig. 10 is a perspective view as seen from above of the protective covering shown in Fig. 9, including a separable strap conductor structure, Fig. 11 is a view in elevation looking toward the leading edge at the root portion of the propeller blade showing another modification of the covering and a separable strap conductor structure, parts being broken away, Fig. 12 is a sectional view taken along line 12—12 of Fig. 11, Fig. 13 is a view in elevation taken at the region of the junction between a conductor element of the covering and the separable strap conductor structure showing a modified arrangement for electrically connecting the strap to the conductor element, parts being broken away, and in section, and Fig. 14 is a perspective view as seen from above of a modified construction of the protective covering including separable strap conductor members at each end of the covering.

In the embodiment of the invention shown in Figs. 1 to 4, inclusive, protective coverings 20 are mounted at the leading edges of blades 21a and 21b of propeller 21 and extend chordwise for at least a part of the blades but may include the whole blade, if desired, and extend radially from root portions 21c and 21d to substantially the tip portions 21e of the blades but may be of greater or lesser radial extent, if desired. As shown especially in Fig. 2, the covering 20 includes an inner layer 22 of resilient insulating material, such, for example, as a non-conductive rubber or other rubber-like material, a resilient outer layer 23 of an electrically conductive composition including rubber or other rubber-like material, and a pair of spaced-apart conductor elements 24 and 25 of said electrically conductive composition sandwiched between the inner and outer layers 22 and 23 in the marginal portions 20a and 20b of the protective covering. The resilient composition may comprise rubber, either natural or synthetic, neoprene, or other resilient rubber-like material, containing in such composition particles of electrically conductive substance such, for example, as graphite, acetylene black, or metal powder. The outer layer 23 is provided desirably with a smooth exterior surface for avoiding turbulent ambient flow of air and minimizing the adhesion of ice thereto. Preferably embedded in each of the conductor elements 24 and 25 are braided wire conductors 26 and 27 of copper or other suitable highly conductive material, although the conductors may be flat strips, if desired. A filler element 28 of insulating material, such, for example, as non-conductive rubber or other rubber-like material, is disposed between the inner and outer layers, and extends between the adjacent margins of the conductor elements 24 and 25. Also, filler strips 29 and 30 tapering in section and of similar insulating material as the element 28 are positioned in the margins 20a and 20b adjacent the conductor elements 24 and 25 and between the inner and outer layers 22 and 23, in the manner shown in Fig. 2. The marginal portions 20a and 20b thus taper to thin edges so that the smooth aerodynamic profile of the blade is maintained, thereby substantially maintaining the full propulsive efficiency of the propeller.

The protective covering 20, as shown especially in Fig. 3, is tapering in form radially outward, a wider portion 20c being radially innermost, for disposition at the root portion 21c and 21d of the blade, and a narrower portion 20d being radially outermost for disposition substantially at the tip portion 21e of the blade.

The braided wire conductors 26 and 27 are embedded desirably in the conductor elements 24 and 25 and extend continuously from the conductor elements to and through integral strap portions 31 and 32 of the covering and are disposed between a pair of superimposed strips 31a of suitable sheet insulating material, such, for example, as rubber coated fabric, the strips 31a being sandwiched between the inner and outer layers, which construction also reinforces the wide end of the covering. The protective covering is united into an integral unit by vulcanization preferably under pressure in a mold.

As shown in Fig. 1 the protective covering 20 is mounted at the leading edges of the blades 21a and 21b, being adhered thereto by an adhesive, such, for example, as a rubber-like cement of the air-curing type which, preferably, is also an insulating material, electrically and also thermally. Other means of attaching the covering may be used, such, for example, as a suitable rubber cement which may be subjected to the application of heat after the protective covering is mounted on the blade for bonding the covering to the blade, or mechanical means such as separable straps at each end of the covering, or both may be provided for this purpose. The integral straps 31 and 32 including the braided wire conductors are adhered also by a suitable adhesive to the blades 21a and 21b. These straps extend rearwardly and curve radially outwardly and the wire conductors 26 and 27 extending beyond the strap portions 31 and 32, pass through an aperture in a reinforcing patch 33 which is adhered in place over the butted ends of the straps by a suitable adhesive, as shown especially in Fig. 4. These conductors 26 and 27 extend through a short length of rubber tubing 34, being separated therein by a strip of suitable electrically insulating material, and continue to and through a suitable supporting bracket 35. As shown especially in Figs. 1 and 4 the wire conductors 26 and 27 may be of sufficient length to assume a radially curved condition under the action of centrifugal force, and the rubber tubing 34 functions as a strain relief to prevent sudden bending of the wire conductors adjacent the root portion of the blade, thus protecting the wire conductors against breakage under extensive flexure thereof. The ends of the wire conductors are connected to a suitable source of electrical energy such as storage batteries, or an auxiliary generator which may be disposed within the fuselage of the aircraft and connected through slip rings. Or the source of power may be mounted on the hub of the propeller.

In the operation of the apparatus, electrical heating current at a suitable voltage may be passed to and through the protective covering 20, the heating current flowing through the wire conductor 27 and through the electrically conductive composition of the conductor element 25 throughout the radial extent thereof to the outer layer 23. This heating current then flows in paths through the layer 23 chordwise around the leading edge of the blade 21a to and through the conductor element 24 to the wire conductor 26 and then back to the source of power. Voltage drop along the conductors and conductor elements 24, 25, 26, 27 is minimized due to the high conductivity of the material thereof. By virtue of the substantially uniform thickness of the outer layer 23 in a chordwise direction, hence substantially uniform electrical conductivity of the same, uniformity of power dissipation of the outer surface is obtained chordwise of the covering in the heated area between the adjacent margins of the conductor elements 24 and 25. The portions of the outer layer 23 extending chordwise from the conductor elements to the edges of the marginal portions 20a and 20b of the covering do not conduct electrical current, and these portions of the layer 23 receive heat by conduction from the heated area, so that the covering is heated entirely across its width for preventing the accumulation of ice thereon.

For the arrangement shown in Figs. 1, 2 and 3 having the tapered form, when the outer layer 23 is of substantially uniform thickness and conductivity radially and the conductor elements 24 and 25 are substantially uniform in section throughout their extent, the temperatures in the heated area at the narrower portion 20d will be greater than the temperatures at the wider portion 20c because of the greater power dissipation in the outer layer 23 in the region of the portion 20d. While this temperature distribution may be desired for some operating conditions a different temperature distribution for the covering may be preferred for other conditions. For example, uniformity of heating radially as well as chordwise may be desired, or greater temperatures in the region of the wide portion 20c at the root of the blade then in the narrow portion 20d at the tip of the blade may be desired.

Uniform temperatures radially outward may be obtained, or the temperatures may decrease radially outward, by suitable provisions of resistivity. The outer layer may be of substantially uniform conductivity and may be reduced in thickness radially, being thickest at the narrow portion 20d, or if substantially uniform in thickness radially, the conductivity of the composition may be reduced radially, or both, the amount of these reductions being suited to the desired result of obtaining radially uniform temperatures or gradually reduced temperatures in the radial direction. Other ways to vary the resistance are also available for effecting these results. For example, the conductivity of the wire conductors 26 and 27 may be decreased progressively from the wide portion 20c to the narrow portion 20d of the covering by using a suitable low-conductivity material such as steel, or the conductors or the conductor elements 24, 25, 26, 27 or combinations thereof may be tapered radially.

While the foregoing discussion applies principally to the radially tapered covering of Fig. 3, other constructions are also suited to varied arrangements of resistances for particular temperature distributions. For example, radially uniform temperatures of the heated area may also be obtained by disposing the spaced-apart conductor elements including the wire conductors in a generally parallel relationship while the outer layer is of substantially uniform thickness and conductivity, in which construction the protective covering may be made generally rectangular rather than tapering in form, as is shown, for example, in the embodiment of Fig. 10, and this rectangular form is suited also to such expedients as are hereinabove discussed for obtaining a decrease of temperatures radially outward.

In the arrangement shown especially in Figs. 1, 2 and 3, the protective covering may extend aft along the blade approximately 20% of the chord thereof which has been found suitable for good results. However, the covering may extend to a greater or lesser extent of the chord and may even completely cover the blade surface, if desired.

When the electrical heating current is passing through the protective covering 20, the adhesion of the ice to the outer surface thereof is promptly reduced since the resulting heat produces a liquid inter-face between the ice and the outer surface, facilitating rapid removal of ice before its thickness attains serious proportions. In rime icing conditions, wherein there is a tendency for the ice to build up in depth at the leading edge rather than to cover a more extensive area also to the sides thereof as is usually the case with glaze ice, a relatively high power input is required to raise the surface temperature at the icing inter-face sufficiently to cause melting since a considerable portion of the heated area rearwardly of the ice is exposed to convection cooling by the ambient air stream. However, for glaze ice formations a relatively greater proportion of the heated area is insulated from the air stream by the ice which usually forms farther aft on the blade section than does the rime ice, so that heat losses are reduced with consequent reduction of power requirement for the covering.

An increase in the rate of ice formation serves to insulate more effectively the heating area of the protective covering from the ambient flow of air and hence assists the functioning of the covering.

In the operation of the protective covering 20 the electrical power input may be varied to obtain temperatures required for coping with the icing conditions being encountered, or may be maintained substantially uniform for providing the desired temperatures effective for removing ice under the worst possible icing conditions. Under either of these operating conditions the adhesion of the ice to the protective covering is electrothermally diminished, preventing effectively the accumulation of ice on the propeller blade.

While the values of resistivity in the covering and of the applied voltage may be varied considerably, in order to provide effective protection under most icing conditions, it is preferred that these values be such as to yield a power dissipation of about two watts or more per square inch of covering surface averaged over the area through which the heating current flows. As an illustration, good results for constructions herein described in severe icing conditions in flight have been obtained with a power dissipation of two to three watts per square inch of surface.

The modified construction shown at 40 in Fig. 5, includes an inner layer 42 of suitable insulating material, an outer layer 43 of electrically conductive composition including rubber-like material, and conductor elements 45 having portions 45a and 45b of said composition sandwiched between the inner and outer layers 42 and 43 in the region of opposite marginal portions 40b of the covering. Each conductor element 45 includes a thick portion 45a adjacent the marginal edge of the protective covering and a portion 45b of lesser thickness extending chordwise toward the opposite conductor element but spaced therefrom centrally of the covering, and has embedded desirably, in the portion 45a a braided wire conductor 47 of suitable material such as copper. A filler element 48 of suitable insulating material is disposed between the inner and outer layers 42 and 43 between the adjacent margins of the conductor elements and includes a portion sandwiched between the inner layer 42 and the portions 45b of the conductor elements 45. Filler strips 49, tapered in section, of suitable insulating material, are disposed adjacent the outer margin of the conductor elements and between the inner and outer layers 42 and 43 for providing for a thin edge of the margins of the covering, whereby the aerodynamic efficiency of the propeller is maintained.

In the operation of the covering 40, electrical heating current flowing through the braided wire conductor 47 passes through the conductor element 45, part of the current flowing into the outer layer 43 in the thick portion 45a and part of it flowing into the outer layer 43 in the portion 45b. Since the conductivity of the portion 45a is greater than that of the portion 45b of the conductor elements 45 and the conductivity of the outer layer 43 between the adjacent margins of the portions 45b of the conductor elements is less than the conductivity of portions 45a and 45b, different power dissipation and temperatures chordwise are obtained at the outer surface of the covering. The portions of the outer layer 43 extending aft from the conductor elements to the edges of the marginal portions 40b receive heat by conduction. In this manner graduated chordwise temperatures of the covering are provided, the highest temperatures occurring in the central region of the leading edge, which make for most effective heating for ice removal with a given power input. Such a graduated chordwise temperature distribution of the covering without ice is illustrated by the curve "A" shown in Fig. 5, the distance to the curve in the normal direction from any point on the surface representing the temperature at that point.

The protective covering 40 may be radially tapered in form or generally rectangular, or other suitable form, as desired. Uniform or graduated temperatures radially may be obtained as described hereinabove for the embodiment of Fig. 1.

The construction shown at 50 in Fig. 6 is a modification of that shown in Fig. 5 in the respect of portions of the conductor elements. The protective covering 50 includes an inner layer 52 of suitable insulating material, an outer layer 53 of electrically conductive composition including rubber-like material, and conductor elements 55 including portions 55a and 55b of said composition sandwiched between the inner and outer layers 52 and 53 in the marginal portions 50b of the covering. Braided wire conductors of suitable material are preferably embedded in the thick portion 55a of each conductor element, which portion is substantially rectangular in section. The portion 55b of each conductor element is tapering in thickness in a chordwise direction extending from the portion 55a toward the opposite conductor element but spaced desirably therefrom centrally of the covering. A filler element 58 of suitable insulating material is disposed between the inner and outer layers 52 and 53, and includes portions thereof extending between the inner layer 52 and the portions 55b of the conductor elements. Filler strips 59, tapering in section and of suitable insulating material, are disposed in the marginal portions 50b of the covering for providing thin edges along these margins thereby facilitating smooth flow of air over the aerodynamic profile of the blade.

In the operation of the protective covering 50, electrical heating current may flow through the wire conductor 57, pass through the composition of the conductor element, partly in the portion 55a and partly in the portion 55b to the outer layer 53, and then flow through the outer layer 53 around the leading edge to the conductor element and wire conductor arrangement in the opposite marginal portion of the covering. The portions of the outer layer 53 extending from the conductor elements aft to the edges of the marginal portions 50b receive heat by conduction.

Different temperatures are obtained chordwise of the covering by virtue of the varying conductivity of the conductive portions of the covering, the heat across the outer layer adjacent the portions 55a being less intense than the graduated heat across the outer layer adjacent the portions 55b, and the greatest intensity of heat occurring centrally of the covering between the adjacent margins of the conductor elements.

The arrangements shown in Figs. 5 and 6 are especially suitable for the removal of rime ice formations and are effective also for the removal of glaze ice formations. Since rime ice forms on the immediate leading edge and builds forwardly, the higher temperatures in this region promoted in these constructions especially suit the requirements of this icing condition, while sufficient heating to the sides of this region is provided to take care effectively of other ice such as glaze ice.

Another embodiment of the invention is shown at 60 in Fig. 7, which embodiment includes means for electrically heating the spanwise marginal portions in addition to the intervening portions of the covering. The protective covering 60 includes an inner layer 62 of suitable insulating material, such as non-conducting rubber-like composition, an outer layer 63 of electrically conducting composition including rubber-like material, conductor elements 64 and 65 of said conducting composition disposed between the inner and outer layer 62 and 63 in marginal portions 60a and 60b, and a filler element 68 of suitable insulating material sandwiched between the inner and outer layers and extending between adjacent margins of the conductor elements. Braided wire conductors 66 and 67 are preferably embedded in the conductor elements 64 and 65, which conductor elements are tapering in section chordwise toward the marginal edges of the covering.

The outer layer 63 extends aft beyond the conductor elements 64 and 65 and the inner layer 62 for providing thin edge portions 63a and 63b of the marginal portions 60a and 60b. These edge portions 63a and 63b are adhered to the propeller blade 61 by a suitable rubber-like cement of the air-curing type having a low electrical conductivity for providing a high resistance leakage path for electrical current from the outer layer 63 to the propeller blade 61.

In the arrangement shown in Fig. 7, electrical heating current may flow through the wire conductor 67 and pass through the composition of the conductor element 65 along the face thereof in contact with the outer layer 63. The greater portion of the current then passes through the outer layer 63 chordwise to the conductor element 64 and wire conductor 66. A lesser portion of the heating current also passes from the conductor element 65 through the outer layer 63 in the marginal portion 60b and through the bypass connection between the portion 63b and the propeller blade 61. This by-pass current then flows through the blade to the opposite edge portion 63a and along the outer layer 63 to the conductor element 64.

By virtue of this construction lesser temperatures may be obtained at the outer surface of the marginal portions 60a and 60b and greater temperatures in the portion of the covering extending between the conductors 64 and 65. The protective covering 60 may be made radially tapering or generally rectangular in form, and uniform or graduated temperatures radially may be obtained as described hereinabove for the protective covering 20.

A further modified construction of the protective covering is shown at 70 in Fig. 8, which construction provides for passing a heating current through substantially the entire width of the covering. The covering 70 comprises an inner layer 72 of suitable insulating material, an outer layer 73 of electrically conductive composition, and conductor elements 75 of said composition including suitable wire conductors 77 sandwiched between the inner and outer layers in the opposite marginal portions 70b of the covering. The conductor elements 75 comprise thin portions 75b preferably tapering in section chordwise toward the edges of the marginal portions 70b and terminating in end portions 75a similarly tapered in section and having surfaces of limited extent in contact with the margins of the outer layer 73. Filler elements 78 and 78a of suitable insulating material are sandwiched between the inner and outer layers 72 and 73 and extend between adjacent margins of the conductor elements. Filler element 78a includes marginal portions sandwiched between the outer layer 73 and the tapering portions 75b of the conductor elements for confining the passing of electrical current to the outer layer through the end portions 75a. The covering 70 may be radially tapering or generally rectangular in form, or of other suitable form, as desired.

The propeller blade 71 may have a depressed area along the leading edge in which area the covering is mounted and attached thereto as by a suitable adhesive. In this manner a flush mounting of the covering on the blade is provided, contributing to a smooth aerodynamic profile of the blade.

For the arrangement shown in Fig. 8, electrical heating current may pass through the wire conductor 77 and flow chordwise through the conductive composition of the portion 75b of the conductor element into the end portion 75a. The current passes from the end portion 75a into the margin of the outer layer 73, then flows chordwise to and through the conductor element and wire conductor arrangement in the opposite margin of the covering 70.

Another embodiment of the invention, as shown at 80 in Figs. 9 and 10, provides for obtaining graduated chordwise temperatures across the covering. The covering 80, which may be of generally rectangular form, comprises an inner layer 82 of suitable insulating material, an outer layer 83 of electrical conductive composition including rubber-like material, a series of chordwise spaced-apart conductor elements 84a to 84d and 85a to 85d of said composition disposed between the inner and outer layers 82 and 83, and filler elements 88 to 91 of suitable insulating material disposed between the layers 82 and 83 and between adjacent margins of the conductor elements. Filler strips 92 and 93 tapering in section and of suitable insulating material are sandwiched between the inner and outer layers in the margins of the covering for providing a thin edge thereof to promote smoothness of flow of air around the profile of the propeller blade 81.

The conductor elements may be of any desired shape and may be substantially uniform in section throughout their extent along the covering. The chordwise intervals between the conductor elements may be of gradually increasing extent from the center to the margins of the covering, the narrowest interval being the middle chordwise portion of the covering between the elements 84c and 85b.

As shown especially in Fig. 10 the conductor elements are interconnected electrically with the source of power by means of a separable strap conductor structure 94, the conductor structure being mounted at the end of the covering 80 which is to be disposed adjacent the hub of the propeller. The outer layer 83 terminates short of said end for facilitating a flush mounting of the strap conductor structure 94 with respect to the outer layer. The strap conductor structure 94 comprises a strap portion 95 of suitable electrical insulating material such as non-conducting rubber-like material having embedded therein in spaced-apart relationship a pair of braided wire conductors 96 and 97. For electrically inter-connecting the conductor elements of the covering in parallel, contactor elements 98, preferably tapering to a point, are secured as by soldering to the wire conductors 96 and 97 and project from the inner face of the strap conductor structure 94, whereby the contactor elements 97 are embedded in the conductor elements, when the structure 94 is mounted on the covering and attached thereto as by a suitable adhesive. While single-point contactor elements or penetrating prongs are shown, other forms having a plurality of contacting points, for example, may be provided, and the contactor elements are disposed in spaced-apart relationship along each of the wire conductors 96 and 97 in a manner to provide for electrically connecting the conductor elements in parallel, with alternate conductors of like polarity.

The protective covering 80 is mounted along the leading edge of the propeller blade 81 and attached thereto as by a suitable adhesive, the strap conductor structure 94 being similarly attached to the covering and the root portion of the blade with the respective contactor elements 98 being embedded in the conductor elements. In the operation of the covering, electrical heating current at the desired voltage from a suitable source of power may flow through the wire conductor 96 and contactor elements 98, into the conductor elements 85d, 85c, 85b, and 85a, through the composition of these conductor elements, to and through the outer layer 83 chordwise into the conductor elements 84d, 84c, 84b and 84a. From these conductors 84a to 84d, inclusive, the electrical current passes to the contactor elements 98 and along the braided wire conductor 97 to the source of power. The heating current flowing through the alternate-positioned conductor elements 85a to 85d, inclusive, passes through adjacent portions of the outer layer 83, these portions being of graduated conductivity by virtue of their varying chordwise extent, to and through the alternately disposed conductor elements 84a to 84d, inclusive. This arrangement thus provides for the desired graduated intensity of heating chordwise of the covering 80. Gradually decreasing temperatures are obtained toward the margins when the heating current passes through the conductor elements and the outer layer in the heated area extending between the conductor elements 85a and 85d in the respective margins of the covering, the highest temperatures being in the portion between the conductor elements 84c and 85b. The portions of the outer layer 83 extending aft from the conductor elements 84a and 85d to the edges of the covering receive heat by conduction.

When the conductor elements are substantially uniform in section radially along the covering and the outer layer 83 is of substantially uniform thickness and conductivity throughout its extent, non-uniform temperatures radially are obtained with the higher temperatures at the region of the root portion of the blade because of voltage drop radially along the conductor elements. Uniform temperatures radially may be obtained as described hereinabove for the Fig. 1 construction. For example, the conductor elements may be graduated in section along the covering, or the outer layer may be of graduated thickness radially, or both.

As illustrated in Figs. 11 and 12 a separable strap conductor structure 100 may be used for electrically interconnecting to the source of power the protective covering, indicated at 120. The strap conductor structure 100 of non-conducting rubber-like material comprises strap portions 101 and 102, tubular portion 103, a pair of braided wire conductors 104 and 105, and contactor plate elements 106 and 107 attached as by soldering to end portions 108 and 109 of the wire conductors. These contactor plate elements 106 and 107 have one or more tapering portions projecting outwardly for embedding in the conductor elements 124 and 125 of the covering 120. The strap conductor structure 100 includes in the strap portions 101 and 102, portions 101a and 102a extending beyond the contactor plate elements 106 and 107 to provide for overlapping relationship of these portions 101a and 102a at the root portion 121c of and at the region of the leading edge of the propeller blade 121 for more securely attaching the conductor structure thereto and for facilitating the servicing or removal of the covering.

As shown especially in Fig. 12, after the protective covering 120 has been mounted on the propeller blade 121, the strap portions 101 and 102 embrace the root portion 121c of the blade and the portions 101a and 102a thereof are disposed in overlapping relationship exteriorly of the protective covering, and the contactor plate elements have their projecting portions embedded in the conductor elements 124 and 125 in contact with the wire conductors therein. These strap portions 101 and 102 are adhered to the propeller blade and the protective covering as by a suitable adhesive such as non-conducting rubber cement. This separable strap conductor structure 100 thus facilitates connecting the protective covering to the source of power and provides for retaining the end of the covering in place against the propeller blade while permitting the servicing or removal of the covering without removing the structure 100 from the blade.

In Fig. 13 is shown an alternative construction indicated by 220 for the strap portions 101 and 102 at the ends of the wire conductors 104 and 105. This construction has contactor plate elements 106a and 107a which do not have portions projecting outwardly, which plate elements are of suitable electrically conducting material such as copper strip, for example. The wire conductors 126 and 127 of the conductor elements 127 extend beyond the end of the covering and are bent backwardly in overlapping relationship with the protective covering at the outer surface thereof and in overlapping electrically contacting relationship with the contactor plates.

A further embodiment of the protective covering 110 is shown in Fig. 14 and comprises an inner layer 112 of suitable insulating material, an outer layer 113 of electrically conductive composition, and separable strap members 114 and 115 of suitable insulating material for attaching the ends of the covering 110 to the propeller blade. The outer layer 113 may be of uniform thickness throughout, or of graduated thickness chordwise or radially, or both for obtaining the desired temperatures and the covering may be radially tapering or other suitable form. The strap members 114 and 115 have embedded therein braided wire conductors 116, 117, which conductors are electrically connected to elongated contactor elements 118 and 119 of suitable stiff conductive material such, for example, as copper strip. The contactor elements are disposed in electrical contact with the outer layer 113. The strap members 114 and 115 may be attached to the covering and the propeller blade by a suitable adhesive.

In the operation of the covering 110 electrical heating current may flow through the conductor 116 to the contactor element 118 and to and through the outer layer 113 to the contactor element 119 at the opposite end of the covering. The current passes from the contactor element 119 through the wire conductor 117, which may be grounded to the propeller blade for completing the electrical circuit.

With respect to the various embodiments herein described, the components may be united by vulcanization preferably under pressure in a suitable mold. The coverings may be attached to the propeller blades by a suitable adhesive such, for example, as an air-curing type of cement including rubber or other rubber-like material, which, preferably, is also an insulating material, electrically and also thermally. However, other means of attaching the coverings to the blades may be used, for example such as those described hereinabove with reference to the embodiment of Fig. 1.

Variations may be made without departing from the scope of the invention as it is defined in the following claims.

I claim:

1. A protective covering for preventing the accumulation of ice on aircraft, said covering comprising electrically conductive composition including resilient rubber-like material having particles of electrically conductive substance therein, said covering being more conductive in spaced-apart portions thereof than in an intervening portion thereof, and conductor means including flexible elements disposed within and interconnected electrically with said spaced-apart portions for passing electrical heating current to and through said portions to obtain a higher temperature at said intervening portion than at said spaced-apart portions, the power dissipation characteristics of said electrically conductive composition being such as to provide the different temperatures at said portions for effectively preventing said accumulation of ice.

2. A protective covering for preventing the accumulation of ice on aircraft, said covering comprising electrically conductive composition including resilient rubber-like material having particles of electrically conductive substance therein at the surface of said covering, said covering comprising a series of spaced-apart conductors extending along the covering in electrical communication with said composition at a series of spaced-apart positions transversely across the covering, said conductors and said composition being constructed and arranged for different conductivity in some portions of said covering than in others to obtain graduated heating across said series.

3. Apparatus for preventing the accumulation of ice on a propeller blade, said apparatus comprising a covering for at least a portion of said blade at its leading edge, said covering comprising a composition including resilient rubber-like material containing particles of an electrically conductive substance therein and said covering being more conductive in a portion extending along the covering radially of said blade in the region of the leading edge than in a portion adjacent thereto extending radially therefrom, and means for passing electrical heating current to and through said composition to obtain radially graduated temperatures at said portions of the covering.

4. Apparatus for preventing the accumulation of ice on a propeller blade, said apparatus comprising a covering for at least a portion of said blade at its leading edge, said covering comprising an outer layer of electrically conductive composition including rubber-like material having particles of electrically conductive substance therein, a mass of electrically conductive composition in each opposite marginal portion extending along said covering, said mass being integrally united with said outer layer and being of less thickness in a region thereof toward the center of said covering than in a region nearer the margin of the covering for providing less conductivity of the mass in the first said region than in the second said region, means for passing electrical heating current to and through said covering to obtain different temperatures at the center of said covering than at said marginal portions, and an inner layer of insulating material underlying said outer layer and said masses of said composition and being of greater thickness at regions of higher temperature than at regions of lower temperature of the covering.

5. Apparatus for preventing the accumulation of ice on a propeller blade, said apparatus comprising a covering for at least a portion of said blade at its leading edge, said covering comprising an outer layer of electrically conductive composition including rubber-like material having particles of electrically conductive substance therein, a mass of said composition in each opposite marginal portion extending along said covering, said mass being integrally united with said outer layers and being of uniform and of less thickness in a region thereof toward the center of said covering than in a region nearer the margin of the covering to provide less conductivity of the mass in the first said region than in the second said region, means for passing electrical heating current to and through said covering to obtain a higher temperature at the center of said covering than at said marginal portions, and an inner layer of rubber-like insulating material integrally united with and underlying said outer layer and said masses of said composition and being of greater thickness at said center of the covering than at said marginal portions.

6. Apparatus for preventing the accumulation of ice on a propeller blade as defined in claim 5 in which said mass is of tapering thickness toward the center of said covering.

7. Apparatus for preventing the accumulation of ice on a propeller blade, said apparatus comprising a covering for at least a portion of said blade at its leading edge, said covering comprising an outer layer of electrically conductive composition including rubber-like material having particles of electrically conductive substance therein, an inner layer of resilient rubber-like insulating material, and a conductor element including said composition and flexible stranded material in each of opposite marginal portions of said covering for passing electrical heating current to and through the covering, the elements being sandwiched between said layers and being interconnected electrically with said outer layer at said marginal portions of said covering, said layers and said conductor elements being integrally united and bonded to one another.

8. Apparatus for preventing the accumulation of ice on a propeller blade, said apparatus comprising a covering for at least a portion of said blade at its leading edge including a root portion thereof, said covering comprising electrically conductive composition including rubber-like material having particles of electrically conductive substance therein and spaced-apart conductor elements of flexible material in the extent of said covering for passing electrical heating current to and through said composition, said covering including said conductor elements being positionable at an end thereof to overlie said root portion of said blade, and separable means including flexible conductor means positionable at said root portion in overlapping relation with said covering for conducting said current to and through said conductor elements of the covering, said conductor means comprising spaced-apart penetrating prongs for engaging said conductor elements.

9. Apparatus for preventing the accumulation of ice on a propeller blade, said apparatus comprising a resilient covering of electrically conductive resilient composition including rubber-like material having particles of electrically conductive substance therein for disposition along the leading edge of said blade, said covering being more conductive in regions at opposite marginal portions extending along the covering than in the intermediate portion thereof, flexible conductor means including elements of stranded material in said marginal portions for passing electrical heating current to and through said covering to obtain greater temperature at said intermediate portion than at said marginal portions, and flexible insulating material integrally united with and underlying said composition at said intermediate and said marginal portions and being of greater thickness at said intermediate portion than at said marginal portions, said covering being adapted to conform to the curvature of said leading edge by virtue of the flexibility of said composition and said insulating material.

WILLSON H. HUNTER.

REFERENCES CITED

The following references are of record in the file of this patent:

UNITED STATES PATENTS

| Number | Name | Date |
|---|---|---|
| 2,137,394 | Driscoll | Nov. 22, 1938 |
| 2,167,972 | Crawford | Aug. 1, 1939 |
| 2,205,543 | Rideau et al. | June 25, 1940 |
| 2,314,766 | Bull et al. | Mar. 23, 1943 |

FOREIGN PATENTS

| Number | Name | Date |
|---|---|---|
| 853,799 | France | Dec. 16, 1939 |